US012774636B2

(12) United States Patent
Lee

(10) Patent No.: US 12,774,636 B2
(45) Date of Patent: Oct. 27, 2026

(54) LINEARLY COLLAPSIBLE CLIMBING STICK ASSEMBLY

(71) Applicant: AVID STRATEGIC LLC, Frankenmuth, MI (US)

(72) Inventor: Scott Lee, Frankenmuth, MI (US)

(73) Assignee: AVID STRATEGIC LLC, Frankenmuth, MI (US)

( * ) Notice: Subject to any disclaimer, the term of this patent is extended or adjusted under 35 U.S.C. 154(b) by 634 days.

(21) Appl. No.: 18/226,147

(22) Filed: Jul. 25, 2023

(65) Prior Publication Data

US 2025/0032858 A1 Jan. 30, 2025

(51) Int. Cl.
*E06C 1/38* (2006.01)
*E06C 1/12* (2006.01)

(52) U.S. Cl.
CPC .............. *E06C 1/381* (2013.01); *E06C 1/125* (2013.01)

(58) Field of Classification Search
CPC . A63C 11/22; A63C 11/221; A45B 2009/007; A01M 31/02; A61H 3/068; E06C 1/381; Y10T 403/32475
See application file for complete search history.

(56) References Cited

U.S. PATENT DOCUMENTS 24,044 A * 5/1859 Moulton ................. E06C 1/381 182/189
667,927 A * 2/1901 Weeks .................... E06C 1/125 182/195
1,192,615 A * 7/1916 Frey ........................ E06C 1/381 182/100
3,033,309 A * 5/1962 Fugere ...................... B60R 3/02 182/189
3,635,233 A * 1/1972 Robertson ................ A61H 3/02 135/71
3,999,627 A * 12/1976 Naka ......................... E06C 9/14 182/100
4,325,157 A * 4/1982 Balint ....................... B25G 1/04 15/230.11
5,109,954 A * 5/1992 Skyba ....................... E06C 1/10 182/189
5,439,072 A * 8/1995 Jenkins, Jr. ............. E06C 7/081 182/100
5,704,448 A * 1/1998 Jenkins, Jr. ............. E06C 1/125 182/116

(Continued)

*Primary Examiner* — Colleen M Chavchavadze
(74) *Attorney, Agent, or Firm* — Robert L. Stearns; Dickinson Wright PLLC

(57) ABSTRACT

A tree climbing stick assembly includes a post supporting at least one step and having at least two sections which telescope relative to one another for longitudinal movement between an extended position and a collapsed position. The assembly is mountable to a tree to be climbed such as by a rope. A releasable lock secures the post sections releasably in the extended position for use when climbing. The lock can be released and the sections telescopically collapsed when not in use for ease of transport in a compact state. A tether is secured to each of the sections and prevents longitudinal separation of the sections independent of the releasable lock, such that if the sections were to somehow extend past the extended and locked position, the tether secures holds the sections in telescopic engagement and keeps them from completely separating as a secondary retention system.

21 Claims, 12 Drawing Sheets

(56) References Cited

U.S. PATENT DOCUMENTS

| | | | | |
|---|---|---|---|---|
| 5,806,626 | A | 9/1998 | Jenkins, Jr. | |
| 6,006,399 | A * | 12/1999 | Massaro | F16L 27/1273<br>285/298 |
| 6,341,614 | B1 * | 1/2002 | Tucker | A45B 3/00<br>403/109.1 |
| 7,168,128 | B2 * | 1/2007 | Evans | F16L 27/1273<br>15/144.4 |
| 8,708,102 | B2 * | 4/2014 | Mickens | E06C 1/125<br>182/195 |
| 9,616,317 | B2 * | 4/2017 | Neubauer | A45B 9/00 |
| 9,631,428 | B2 * | 4/2017 | Niemela | E06C 7/188 |
| 9,974,366 | B2 * | 5/2018 | Heim | A63C 11/22 |
| 11,071,362 | B2 * | 7/2021 | Lai | A45B 9/04 |
| 11,140,955 | B2 * | 10/2021 | Hu | A63B 71/0054 |
| 11,148,023 | B2 * | 10/2021 | Roiser | A63C 11/221 |
| 2010/0254751 | A1 * | 10/2010 | McMillan, III | A63C 11/221<br>403/109.1 |
| 2022/0025702 | A1 * | 1/2022 | Hebert | E06C 7/082 |
| 2022/0333442 | A1 * | 10/2022 | Sirlin, III | E06C 1/387 |

* cited by examiner

LINEARLY COLLAPSIBLE CLIMBING STICK ASSEMBLY

BACKGROUND

1. Technical Field

This invention relates generally to tree climbing sticks of the type used by hunters, and often bow hunters, for ascending a tree.

2. Related Art

Tree climbing sticks are often used by hunters to assist in ascending a tree. Some sticks have a long post made of square steel tubing which support a plurality of steps projecting from opposite side of the post. The post is secured to the trunk of the tree by one or more straps or ropes. The post may be of one long piece or of several pieces fit together.

Some hunters prefer climbing sticks that are smaller and more easily transported into and out of the woods and which can be placed and removed quickly for a mobile hunting experience. These sticks have shorter posts of fixed length and may have as few as two steps. The length of the sticks may range from 2 to 3 feet and are meant to be strapped to a backpack or up the trunk of a tree to achieve the desired climbing height.

Advances in mobile climbing sticks have been largely focused on reducing weight and designing the sticks so that they nest together when transported. There remains, however, an unsolved need in the industry to reduce not only weight of mobile climbing sticks but also the package size, and to do so in a simple and convenient manner.

SUMMARY

A tree climbing stick assembly constructed according to an one aspect comprises a post supporting at least one step and having at least two sections which telescope relative to one another for longitudinal movement between an extended position in which opposite ends of the post are spaced a first distance from one another and a collapsed position in which the opposite ends of the post are spaced a second distance from one another that is less than the first distance. The assembly includes a wrap extendable about a tree for securing the assembly for climbing. A releasable lock secures the at least two sections releasably in the extended position for use in climbing. A tether is secured to each of the at least two sections and prevents longitudinal separation of the upper and lower sections independent of the releasable lock.

An advantage of the stick assembly is that the post is made of at least two sections that telescope which enables the assembly to be extended for use in climbing and then collapsed to a shorter, more compact length for transport when not in use. The shorter stowed condition enables sticks to be places in or on backpacks without extending above or below the packs. The collapsed position is less cumbersome to manage when trying to carry multiple sticks while mobile hunting.

The releasable lock secures the sections in the extended position, but is advantageously backed up by the tether which precludes the sections from separating from one another should the sections breach the releasable primary lock. The tether is thus an added connection feature which is normally not relied upon to hold the sections together, but which is always present in the unlikely event that it is needed. This extra level of assurance provides the user with confidence that the telescoping stick cannot inadvertently separate while climbing. The primary lock firmly secures the sections in the extended position but is supplemented by the tether which operates independently of the primary lock to maintain the sections in telescopic engagement even if the primary lock were to for some unknown reason allow the sections to slide past the extended position. The tether thus gives the designer of climbing sticks and users of telescoping-post-type sticks an extra level of assurance that the telescoping post sections will remain engaged under all conditions, independent of the primary lock.

THE DRAWINGS

These and other features and advantages will be fully appreciated as the same becomes better understood when considered in connection with the following drawing figures and accompanying detailed description, in which.

DETAILED DESCRIPTION

Figure 1:
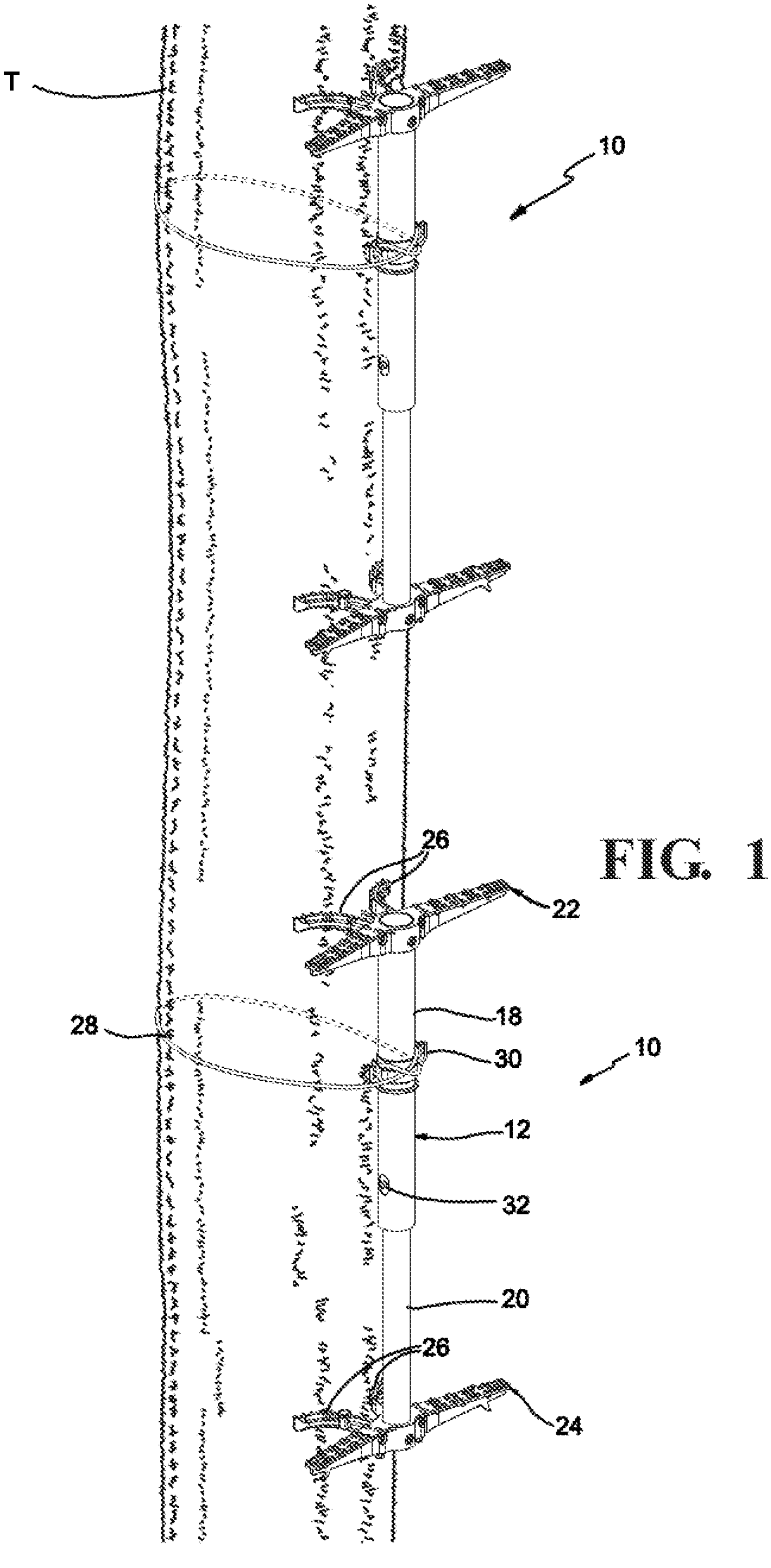
FIG. 1 is an environmental perspective view showing climbing sticks secured to a tree to be climbed.

A climbing stick assembly according to a presently preferred embodiment is indicated generally at 10 in the figures. A plurality of such stick assemblies 10 are shown in FIG. 1 secured to the trunk of a tree T that is to be climbed by a user, such as a bow hunter, in order to ascend to a desired height. The assemblies 10 are spaced up the trunk of the tree T as determined by the user to provide a series of steps which can be engaged by the user's feet and hands to scale the tree T.

Figure 2:
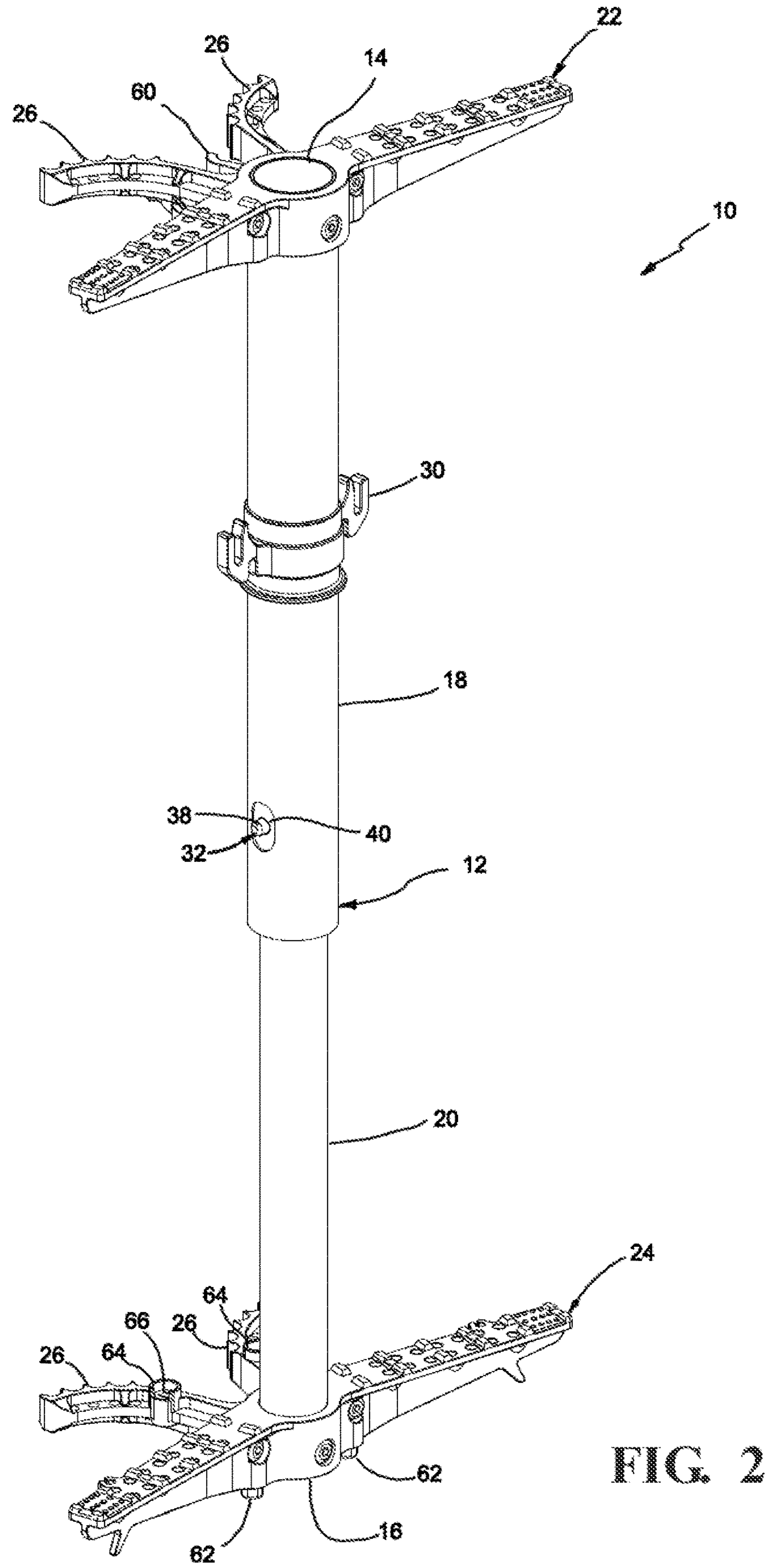
FIG. 2 is a front perspective view of a climbing stick in an extended position.
Figure 3:
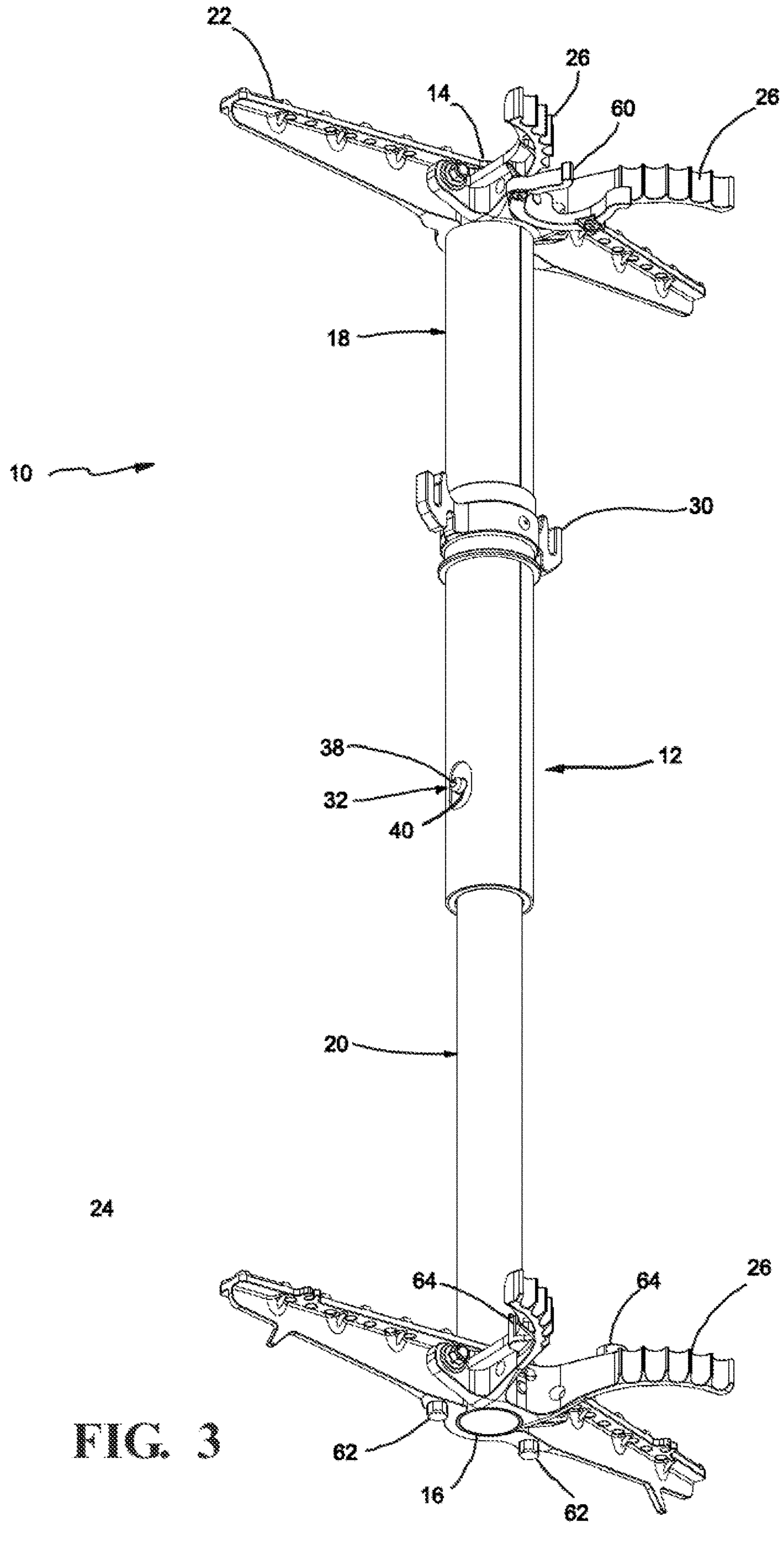
FIG. 3 is a rear perspective view of the climbing stick of FIG. 2.
Figure 4:
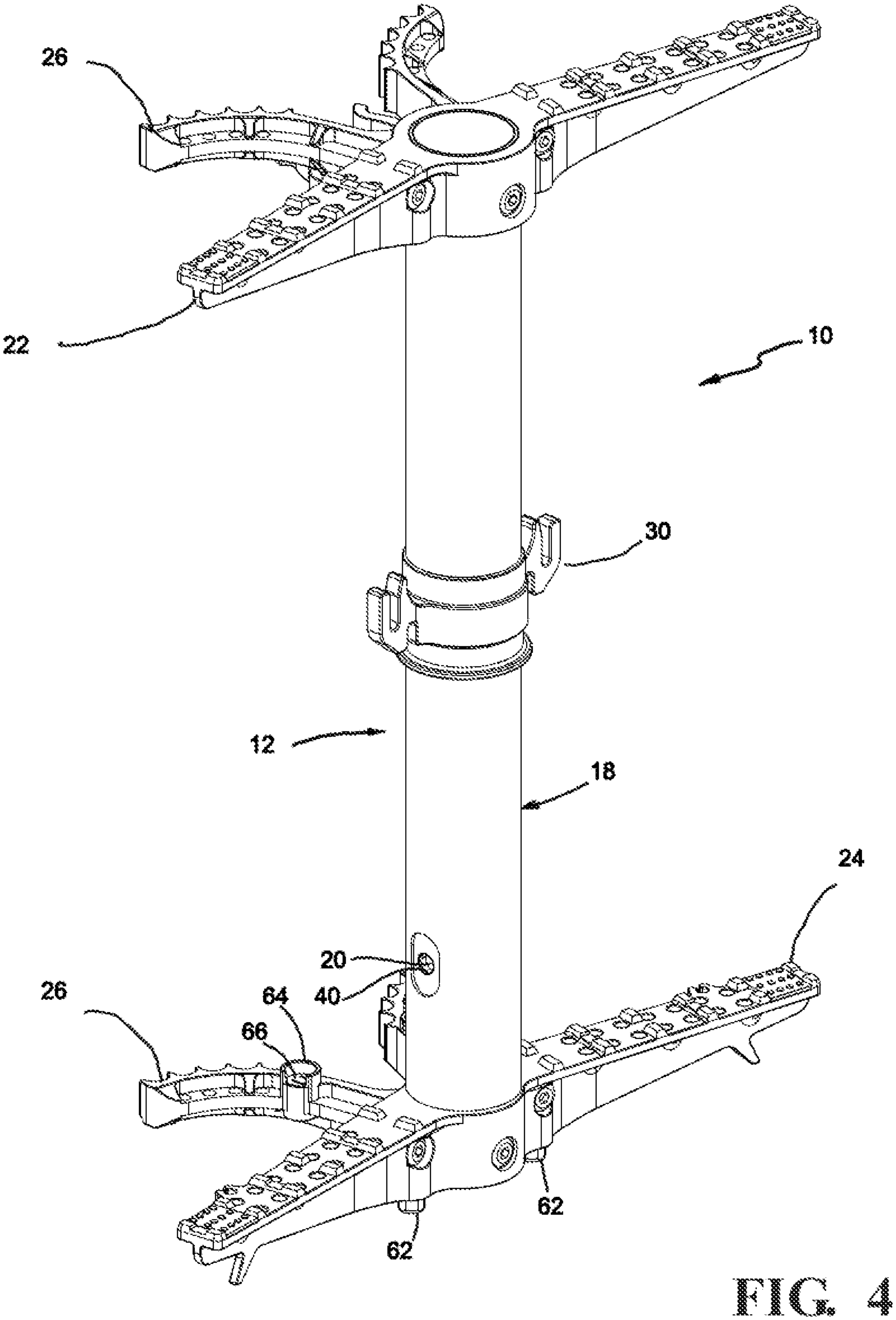
FIG. 4 is a front perspective view of the climbing stick of FIG. 2 in a collapsed position.

FIGS. 2 and 3 illustrate further details of the preferred climbing stick assembly 10, which includes a post 12. The post 12 forms the central spine or support for the assembly 10 and extends longitudinally between an upper end 14 and a lower end 16. The post 12 includes at least two sections 18, 20 which will be referred to as an upper section 18 and a lower section 20 in relation to their orientation when the post 12 is mounted to the tree T as in FIG. 1. The upper and lower sections 18, 20 are separate constructional pieces but are assembled and supported so as to slide telescopically relative to one another for adjusting the effective length between the upper 14 and lower 16 ends of the post 12 between a telescopically extended position shown in perspective in FIGS. 2 and 3 where the ends 14, 16 are spaced furthest apart and a telescopically collapsed position shown in perspective in FIG. 4, where the ends 14, 16 are spaced closer to one another.

The post 12 includes at least one step. More preferably, at least one upper step 22 projects from the upper section 18 and at least one lower step 24 projects from the lower section 20. The upper 22 and lower 24 steps may extend laterally from opposite respective sides of the post 12, or they may extend laterally from both sides as illustrated. The steps 22, 24 may be separately formed from the post 12 and may be fastened thereto by bolts, rivets, adhesive, friction, upsetting, weldments, etc. The post 12 further supports at least one and preferably a pair of standoffs 26 that project from a back of the post 12 adjacent the upper 14 and lower 16 ends and present U-shaped or preferably V-shaped widening jaws that may include jagged tree-gripping serrations along the inner edges thereof. The standoffs 26 may likewise be separately formed from the post 12 and also formed separately from the steps 22, 24 or as one piece with the steps 22, 24. If separately formed, the standoffs 26 may be secured to the post 12 in the same manner as disclosed for securing the steps 22, 24.

The assembly 10 includes a wrap 28 that is extendable about the tree T for securing the assembly 10 for or climbing, as shown in FIG. 1. The wrap 28 may comprise a strap, a belt, webbing, a rope or a tether line. Shown in the drawings is a braided rope 28 which is secured at one end to the upper section 18 of the post 12. After placing the assembly along the trunk of the tree T with the standoffs 26 engaging the trunk and supporting the post 12 and steps 22, 24 away from the tree T, the free end of the rope 28 is extended around the backside of the tree T and then crossed over the front of the post 12 and the rope 28 drawn tight by the user with application of a pulling or tension force on the rope 28. The free end of the tensioned rope 28 is guided beneath one side of a slotted cleat 30 and then wrapped about the cleat 30 to force the rope 28 into narrow slots 32 which pinch the rope 28 and keep it from pulling free and maintaining the holding force. The cleat 30 enables the user to quickly and securely fasten the assembly to the tree T without use of knots or complicated rigging and can be completed in a manner of seconds.

Figure 5:
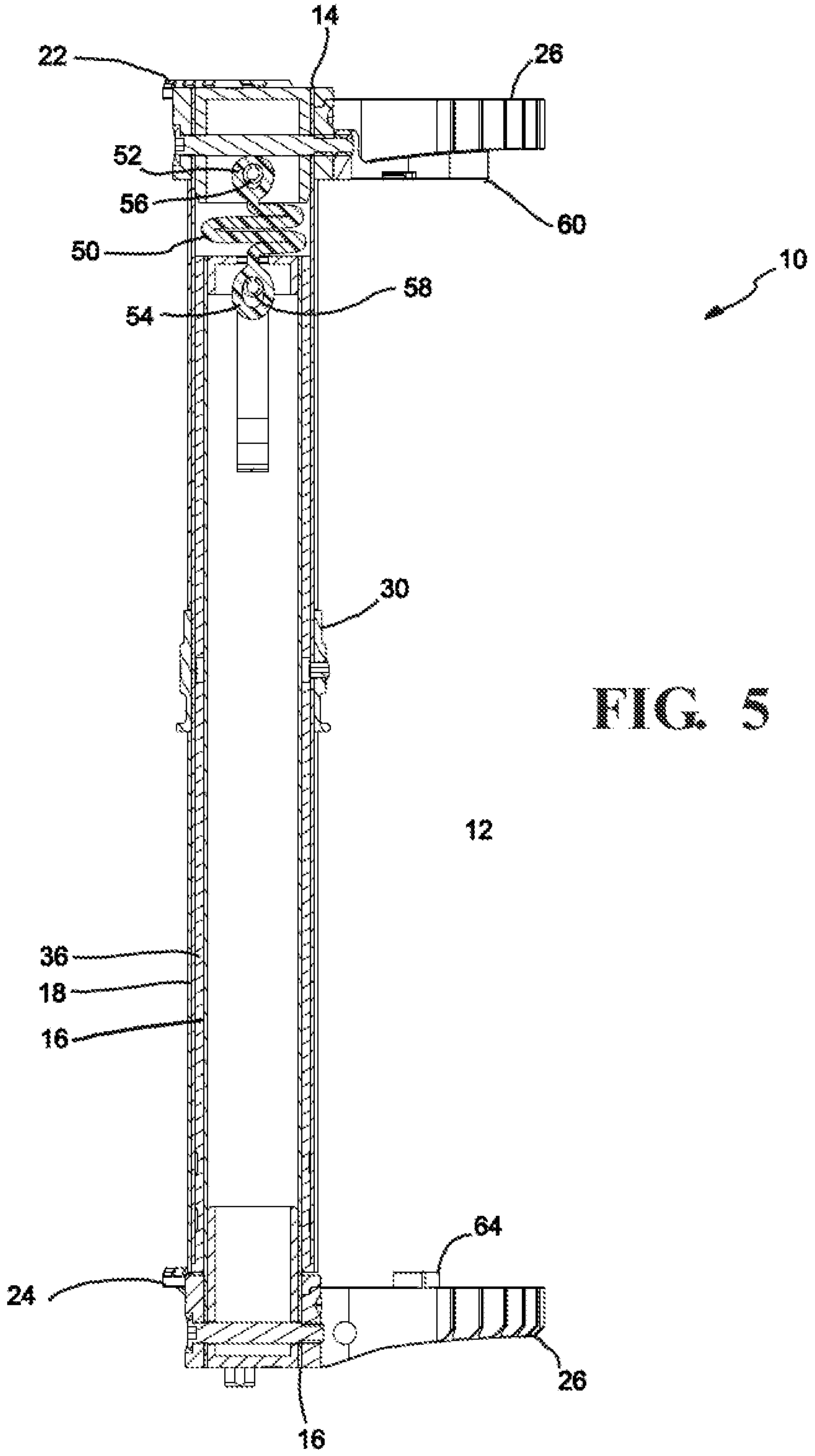
FIG. 5 is a longitudinal sectional view of the climbing stick in the collapsed position of FIG. 4.
Figure 6:
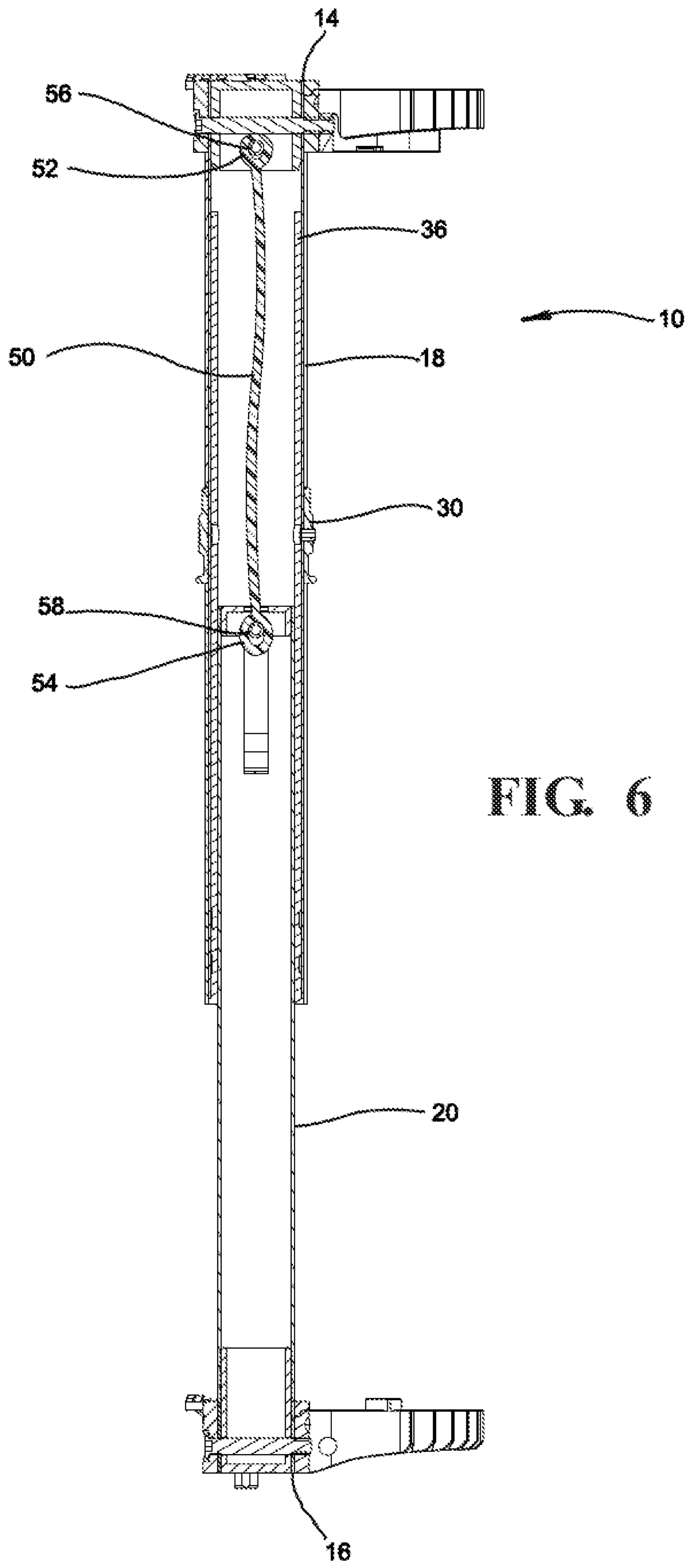
FIG. 6 is a longitudinal sectional view of the climbing stick in the extended position of FIG. 2.
Figure 7:
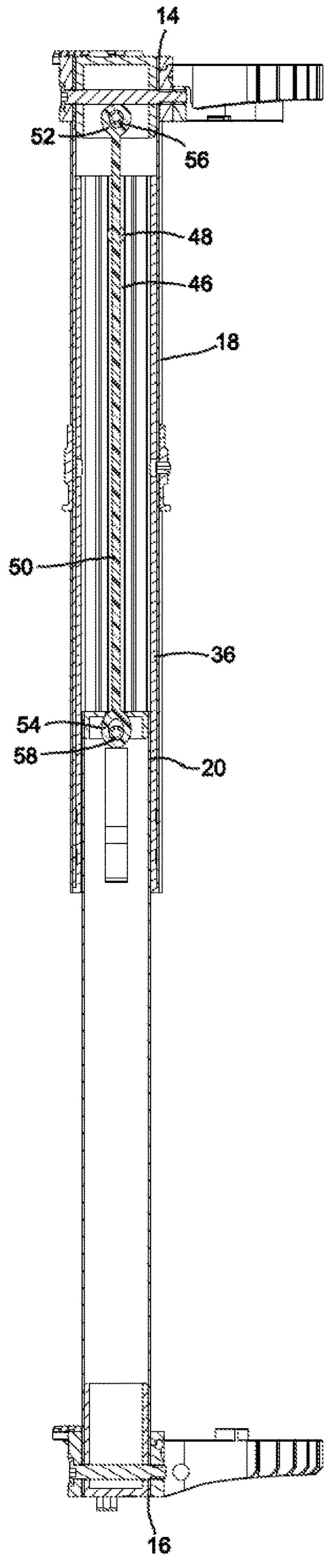
FIG. 7 is a longitudinal sectional view showing the tether in full extension.

Further details about the post sections 18, 20 and their telescopic connection follows below, with additional reference to the cross-sectional views of FIGS. 5-7. The post sections 18, 20 are provided with a primary releasable lock or locking system 32. The lock 32 operates to releasably secure or hold the sections 18, 20 in the extended "use" position, during which time the telescopic sliding action of the sections 18, 20 is immobilized by the lock 32. When locked, the upper and lower sections 18, 20 are slideably and preferably rotationally fixed and are unable to longitudinally contract or extend from the locked extended position, illustrated in FIGS. 2, 3, 6 and 11. The upper 18 and lower 20 sections are each preferably tubular in construction and may be made of high strength aluminum, steel, carbon fiber, molybdenum, titanium, or plastics. The tubular sections 18, 20 are preferably cylindrical in shape with circular cross sections, but the invention contemplates and includes within its scope post sections of other tubular shapes, including square, rectangular, triangular and ovular tubing. The embodiment illustrates the lower section 20 sliding or telescoping within the upper section 18, such that the external size or diameter of the lower section 20 is relatively smaller than the external size or outer diameter of the upper section 18. More specifically, the outer wall surface of the lower section 20 fits snugly but smoothly within the inner wall surface of the upper section 18 for guided sliding movement between the extended and collapsed positions. The upper section 18 preferably has a metal outer tubular shell 34, such as of aluminum, and is preferably has an inner liner 36 of a bearing grade plastic material such as Delron®, to provide a robust but smooth support for the lower section 20. A decorative or noise-dampening sleeve or cover may be provided on the outer surface of the upper section 18 which may further contain desired graphics, such as camouflage. The lower section 20 is preferably made of aluminum and has a smooth, cylindrical outer surface that is in slideable contact with and supported by the plastic liner 36.

Figure 10:
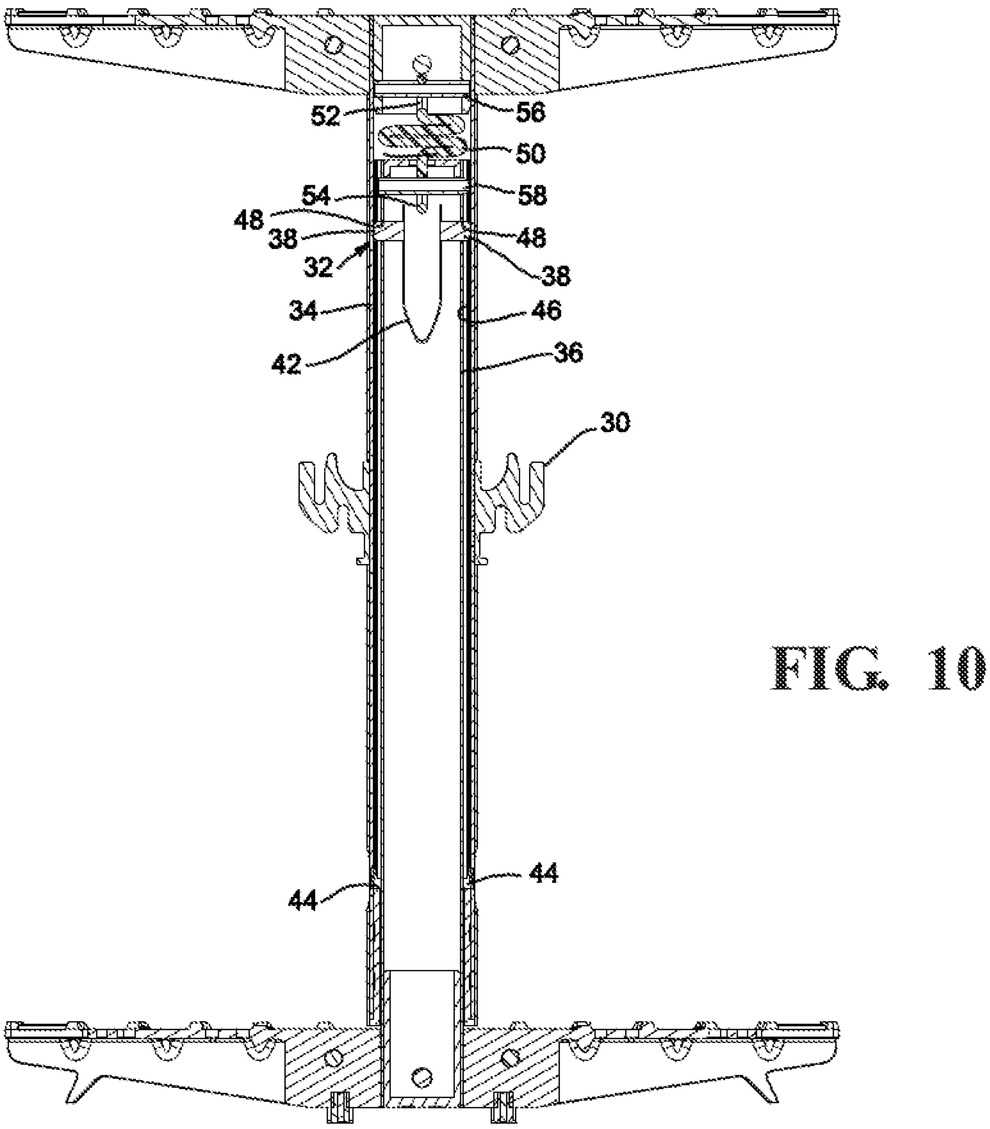
FIG. 10 is a longitudinal cross-sectional view illustrating the climbing stick in the collapsed condition.
Figure 11:
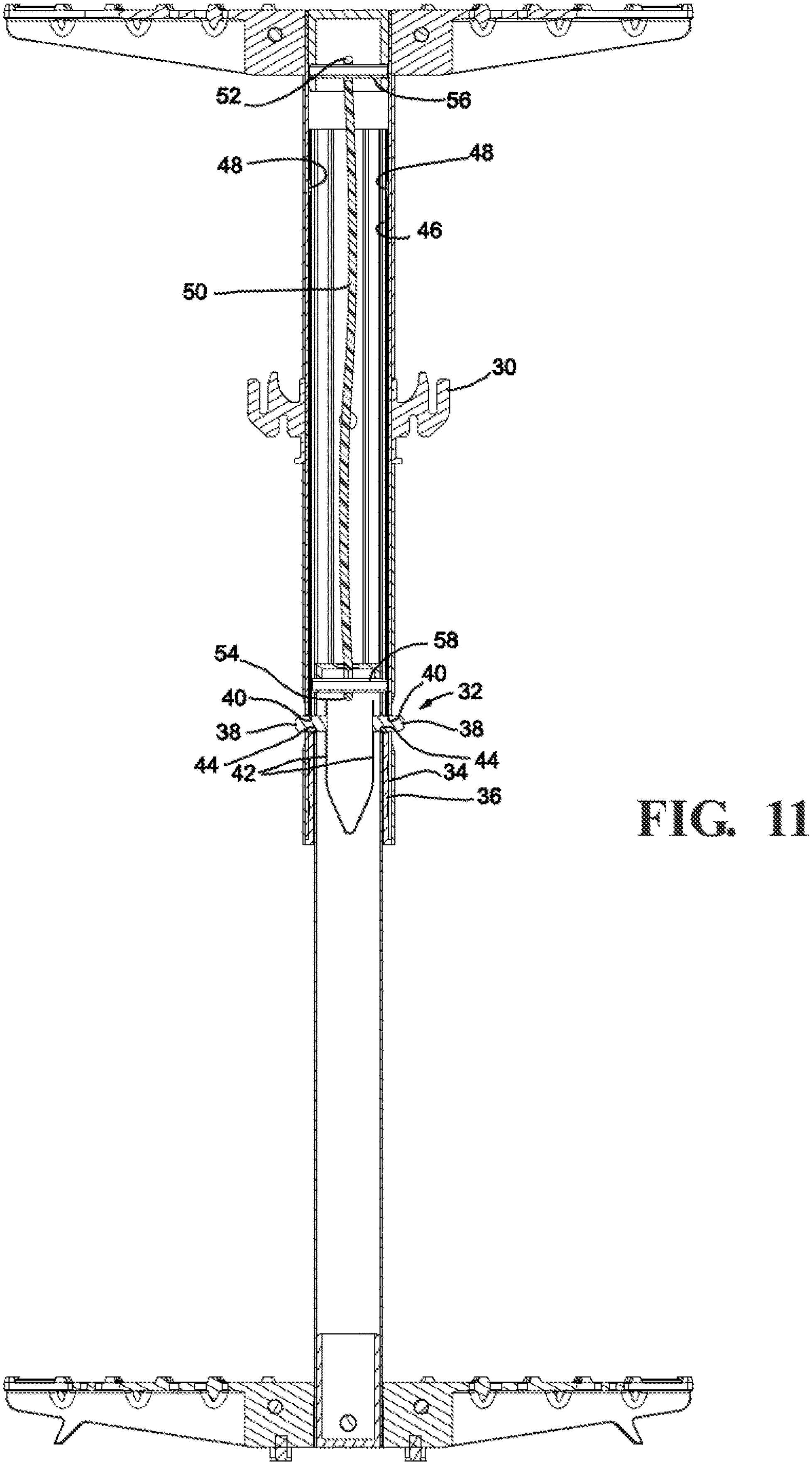
FIG. 11 is a view like FIG. 11 but of the climbing stick in the extended and locked use positon.

The lock 32 is in the preferred form of at least one and preferably two spring pins or spring buttons 38. The buttons 38 are carried by one of the sections 18, 20 and are spring biased radially. The buttons 38 self-register in detents or preferably open slots or windows 40 that are provided in the other of the sections 18, 20 in response to sliding the sections 18, 20 to the extended position in order to lock the sections 18, 20 against further sliding movement. The illustrated embodiment shows the spring buttons 38 supported by an upper region of the lower section 20 and the open slots 40 being provided in a lower region of the upper section 18. More specifically, as shown best in FIGS. 10 and 11, the buttons 38 are formed on ends of spring arms 42 that may collectively have a V-shape and fit within the tubular lower section 20 with the buttons 38 projecting radially outwardly through openings 44 in the lower section 20. The buttons 38 are self-biased outwardly beyond the openings 44 but can be forced to move inwardly against the spring force of the arms 42. The openings 44 support the buttons 44 against longitudinal movement relative to the lower section 20. When in the extended position, the buttons 38 align with and further project into the open windows 40 formed in the liner 36 and shell 34 of the upper section, as best seen in FIG. 11. When registered, the buttons 44 and windows 40 serve to lock the upper and lower sections 18, 20 against longitudinal movement, including toward the collapsed position but also from further movement in the opposite direction beyond the extended position.

When the user wishes to release the sections 18, 20 from the extended position and move them to the collapsed position, the buttons 38 can be manually or bodily depressed radially inwardly while applying a compressive collapsing force to the sections 18, 20. Once the buttons 38 clear their respective windows 40 of the upper section 18, the buttons 38 are caused to slide beneath the inner wall of the upper section to enable telescopic sliding of the sections 18, 20 to the collapsed position. Preferably, the liner 36 is formed with longitudinal guide grooves 46 which extend from the windows 40 to receive and guide the buttons 38 longitudinally along the interior of the liner 36 of the upper section 18 and further keep the sections 18, 20 from rotating relative to one another during telescopic movement. Preferably, the liner 36 is further formed with detents 48 that are spaced longitudinally from the windows 40 and which register the buttons 38 when the sections 18, 20 are compressed to the collapsed position. The longitudinal guide grooves 46 extend between the windows 40 and detents 48 to keep the buttons 38 channeled and rotationally restrained during the telescopic movement and to guide the buttons 38 into either the windows 40 when fully extended, or into the detents 48 when fully collapsed. The registration of the buttons 38 in the detents 48 according to the preferred embodiment is best shown in FIG. 10. The detents 48 are shallow compared to the windows 40 and the buttons 38 are not able to fully extend and lock in the manner they do with the windows 40, as the detents 48 do not extend through the upper section 18 wall, but are blind pockets within the upper section 18. Instead, the shallow detents 48 hold the buttons 38 and provide the user with a positive feel when the post sections 18, 20 are slid to the collapsed condition, but with application of a small extension force, the user is able to pull the buttons 38 out of the detents 48 to move the sections 18, 20 toward the extended condition, when desired.

Figure 12:
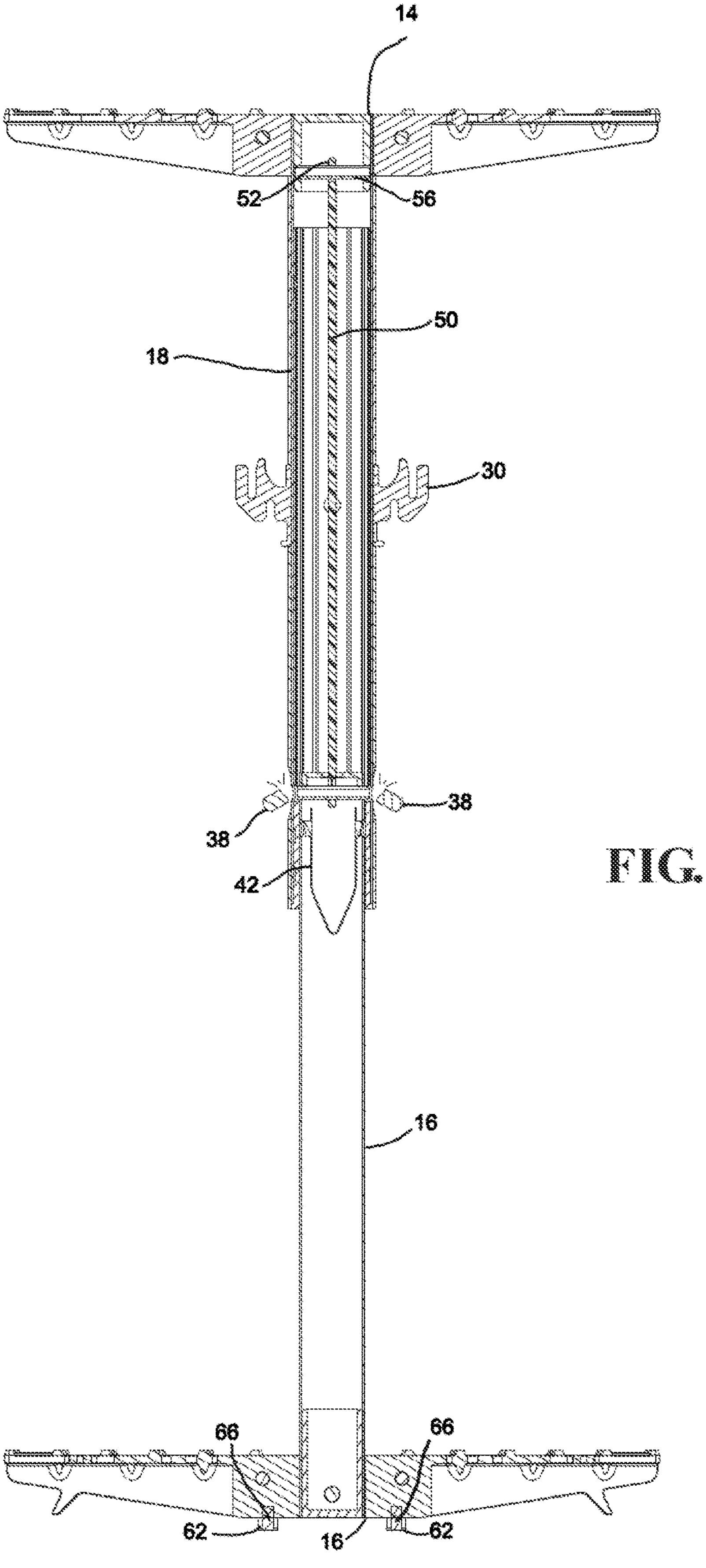
FIG. 12 is a view like FIG. 11 but illustrating the tether line tensioned to preclude separation of the telescoping sections of the climbing stick independent of the primary locking system.

According to a further preferred feature, the assembly 10 includes a tether 50 secured to each of the upper 18 and lower 20 sections and preventing the sections from longitudinal separation independent of the releasable lock 32. Details of the tether 50 are illustrated in FIGS. 10-12 and further described below, but it is to be understood that the purpose and function of the tether 50 is to serve as a secondary retention to the primary lock system 32 and to be present in case the upper and lower sections 18, 20 for whatever reason may extend beyond the normal extended position despite the normal operation of the primary lock 32 so as to preclude the upper and lower sections 18, 20 from fully separating from one another in the longitudinal direction.

The tether 50 preferably comprises a flexible but inelastic cord or rope or cable which is fixed at an upper end 52 thereof to the upper section 18 and fixed at a lower end 54 thereof to the lower section 20. The length and anchor points of the tether 50 are selected to enable free, uninhibited, normal movement of the upper and lower sections 18, 20 between the extended and collapsed positions, but tensioning when the sections 18, 20 are slid past the extended position to keep the sections 18, 20 from disengaging from their telescopic supporting engagement.

The tether ends 52, 54 may be secured by internal anchor structure of the sections 18, 20. The anchor structure may comprise cross pins and more particularly upper and lower roll pins 56, 58 which are pressed into cross holes of the upper and lower sections, respectively, and which capture closed loops provided at the ends 52, 54 of the tether 50. The tether 50 is preferably contained within the interior of the post 12, such that the tether 50 is not visibly externally of the assembly. When the sections 18, 20 are collapsed, the tether line 50 slackens and remains contained within the post 12. As the sections 18, 20 are moved toward the extended position, the longitudinal distance between the roll pins 56, 58 increases and some of the slack is drawn out of the tether 50. But it is only when the sections 18, 20 arrive at or exceed the extended condition that the tether 50 fully tensions to preclude the possibility of further extension and separation of the sections 18, 20. In a preferred embodiment, some amount of slack remains in the tether 50 when the sections 18, 20 are in the extended position, and the tether 50 fully tensions at some point beyond the extended position and before the sections 18, 20 are pulled completely free of one another. The tether 50 may be made of braided Durlon® selected for its strength, durability, abrasion resistance, proven longevity and for its flexibility and inelasticity under tensile load. Since the tether 50 is concealed and inaccessible for replacement, it is designed as a life-of-the-product component of the assembly 10.

Figure 8:
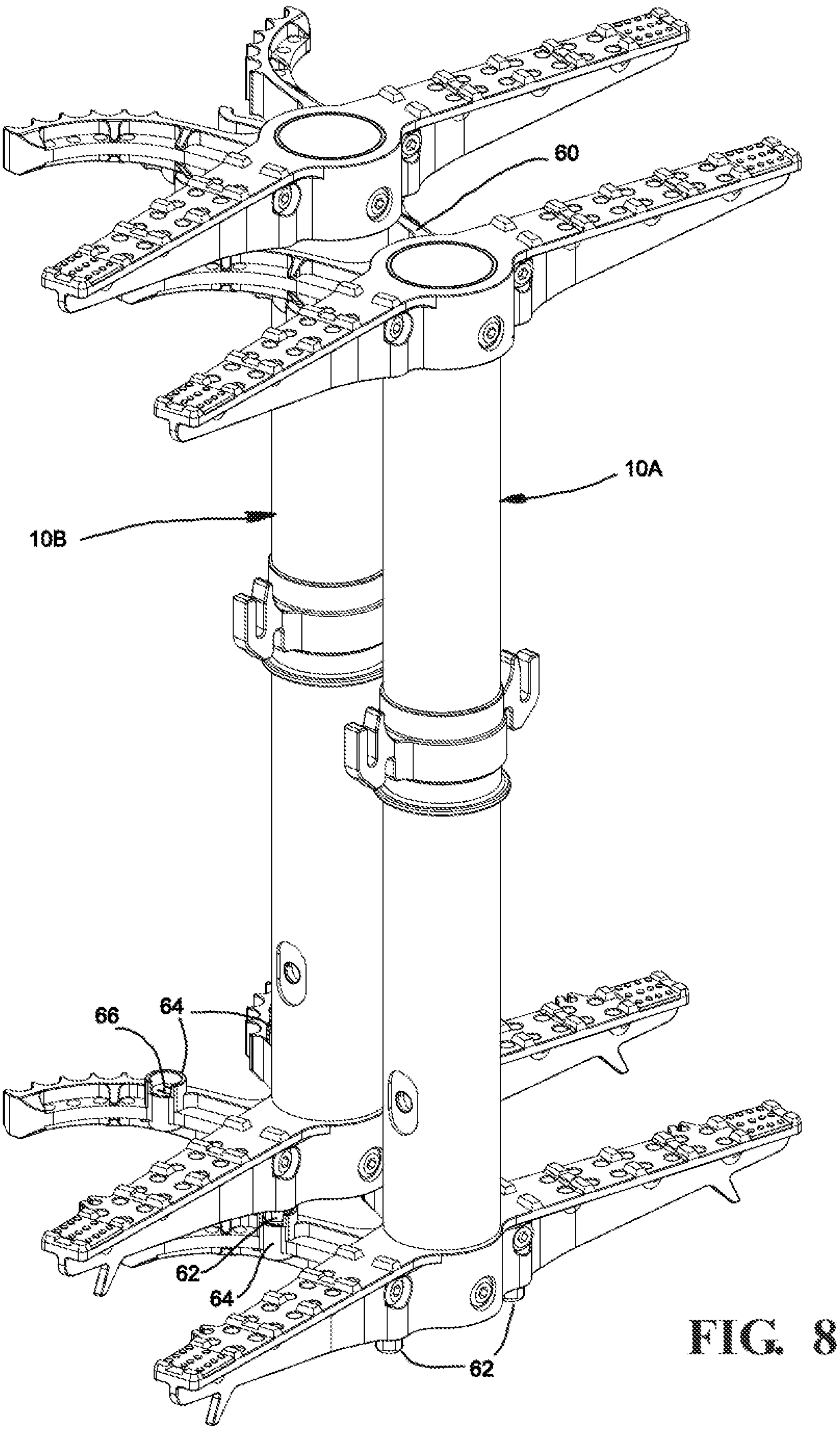
FIG. 8 is a perspective view of a pair of front-to-back nested climbing sticks in the collapsed position.
Figure 9:
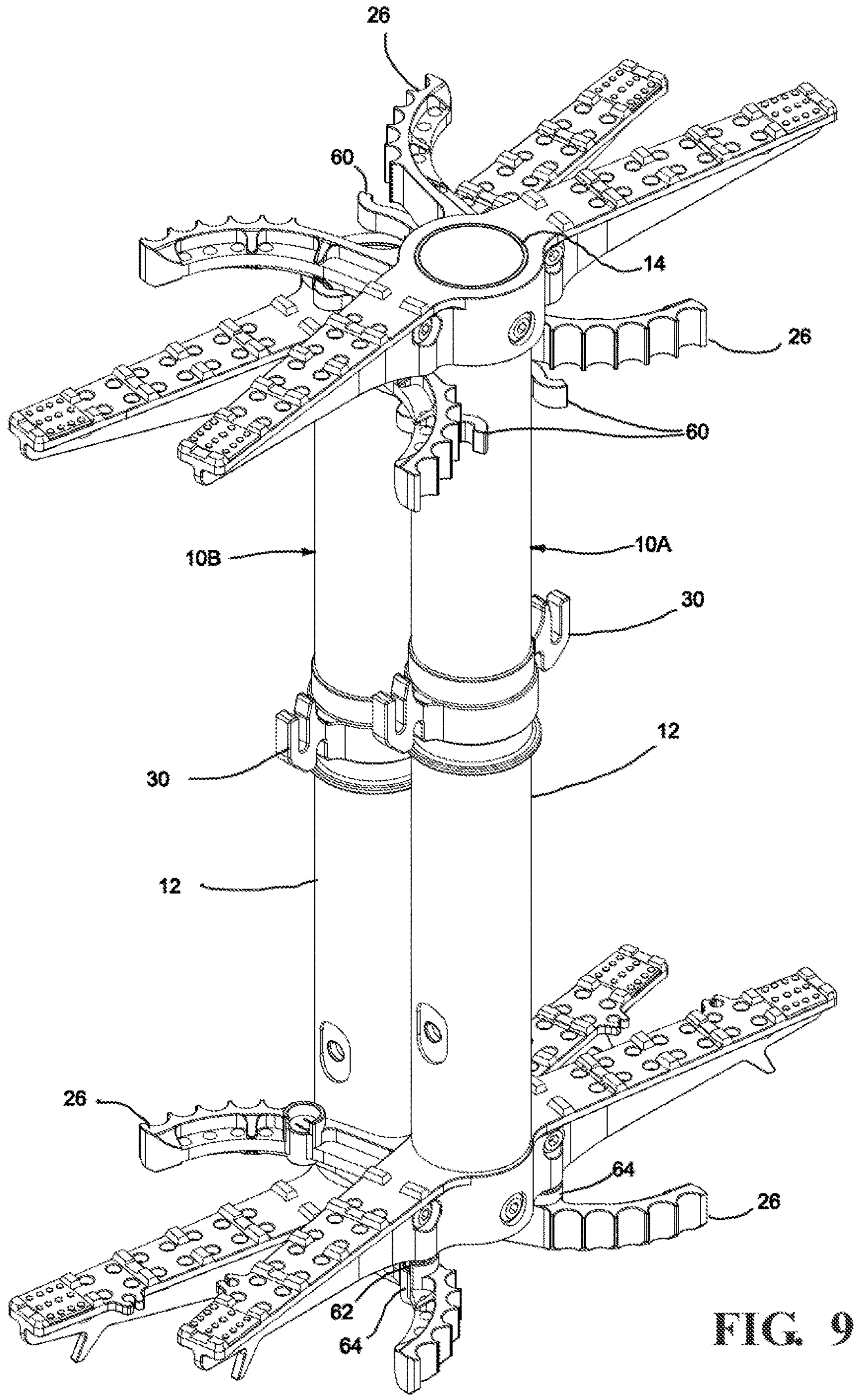
FIG. 9 is a perspective view of the pair of climbing sticks of FIG. 8 but nested front-to-front.

According to a further feature, the stick assembly 10 is configured to nest closely with other like stick assemblies 10 when in the collapsed conditions, as illustrated in FIGS. 8 and 9 for compact storage and transport. Each stick assembly of identical construction includes at least one U-shaped nesting clip 60 projecting outwardly from the backside of the post 12 adjacent at least the upper end 14. The mouth of the clips 60 are relatively smaller than the diameter of the upper section 18 of the post 12 so that the upper section 18 of a companion assembly can be pressed into the clips 60 and retained with firm but releasable grip. The clips 60 are preferably disposed adjacent to and in alignment with the jaw of the standoffs 26. Adjacent the lower end 16 of the post 12 are a set of lugs 62 and pockets 64. The lugs 62 are preferably project downward from the lower step 24 on laterally opposite sides of the post 18 and preferably in a plane containing the longitudinal axis of the post 12. The pockets 64 are formed at the same lateral spacing on the top of the lower standoffs 26 and are positioned and dimensioned to receive the lugs 62 of a companion post when nesting. The lugs 62 and pockets 64 of mating assemblies provide mechanical registration and coupling of the nested assemblies at their lower ends in cooperation with the clips 60 at the lower and upper ends. The lugs 62 and pockets 64 may further be provided with magnets of opposite polarity to help guide and couple the lugs 62 of one assembly with the pockets 64 of the companion assembly. The magnets may be strong rare earth-type permanent magnets to prove a positive, firm feel or register to the user when coupling the lugs 62 and pockets 64.

According to a preferred feature, the relative dimension and positioning of the clips 60, lugs 62 and pockets 64 enable two stick assemblies 10A and 10B to be nested front-to-back as illustrated in FIG. 8. The lugs 64 on the back of the forward-most stick 10A (to the right in FIG. 8) are guided into the pockets 64 of the rearward-most assembly 10B (to the left in FIG. 8). Once registered, the upper end 14 of the stick 10A is tilted toward the stick 10B to guide the upper post section 18 of 10B into the space between the jaws of the standoff 26 and into snap-fit retention with the clip 60 of the stick 10A. The registration of the mechanical-magnetic coupling of the lugs 62 and pockets 64 at the bottom, in combination with the frictional gripping of the clip 60 at the top, together secure the assemblies 10A and 10B releasably together. One or more additional stick assemblies can be added to the top and/or bottom in the same manner to achieve stacks of 3, 4 or more nested sticks as desired.

Alternatively, the same sticks 10A and 10B are configuration to nest together back-to-back if desired, as illustrated in FIG. 9. The sticks 10A and 10B are presented with their standoffs 26 facing one another. The lugs 62 of stick 10A are fitted into the recesses of stick 10B at the bottom. The upper ends are tilted toward one another to snap the clip 60 of stick 10B onto the upper section 18 of stick 10A to secure the sticks 10A, 10B releasable to one another. Additional sticks can be attached front-to-back in the manner described in connection with FIG. 8.

Those skilled in the art will appreciate that the above description and drawings are an embodiment of the invention and are descriptive but not in and of themselves limiting. The invention is defined by the claims. The person of ordinary skill will also appreciate that the invention may be carried out in ways other than as specifically illustrated and described and are contemplated by and may fall within the scope of the invention defined by the claims.

What is claimed is:

1. A tree climbing stick assembly, comprising:

a post supporting at least one step and having at least two sections of the post disposed in telescopic relation with each other for longitudinal telescopic movement between an extended position in which opposite ends of the post are spaced a first distance from one another and a collapsed position in which the opposite ends of the post are spaced a second distance from one another that is less than the first distance;

a wrap extendable about a tree and securable to the assembly for attaching the assembly to a tree to be climbed;

a releasable lock for securing the at least two sections releasably in the extended position; and a tether secured to each of the at least two sections and serving as a secondary retention to the releasable lock, wherein the releasable lock secures the at least two sections releasably in the extended position without reliance on the tether, and wherein the tether is tensioned only when the at least two sections slide past the extended position to preclude the at least two sections from separating from one another.

2. The assembly of claim 1, wherein the tether comprises a flexible line.

3. The assembly of claim 2, wherein the flexible line comprises a length of high tensile braided rope.

4. The assembly of claim 1, wherein the at least two sections define an interior space and wherein the tether is contained within the interior space.

5. The assembly of claim 4, wherein the at least two sections are each tubular.

6. The assembly of claim 5, including a first cross pin secured to one of the at least two sections and supporting one end of the tether.

7. The assembly of claim 6, including a second cross pin secured to the other of the at least two sections and supporting an opposite end of the tether.

8. The assembly of claim 7, wherein the tether has a length that is at least equal to a longitudinal spacing between the cross pins when in the at least two sections are in the extended position.

9. The assembly of claim 1 wherein the tether retains the at least two sections together in the event the at least two sections are telescoped beyond the extended position.

10. The assembly of claim 1, wherein the locking device comprises at least one spring-biased button carried by one of the at least two sections that is slideable within the other of the at least two sections during movement between the collapsed and extended positions and wherein the other of the at least two sections includes at least one detent associated with the extended position for releasably registering the button to lock the telescopic sections in the extended use condition.

11. The assembly of claim 10 wherein the first detent associated with the extended position is open to the exterior of the other telescopic section and the button is visible and manually depressible by a user for retracting the button from registration with the first detent to enable sliding movement of the at least two sections from the extended position toward the collapsed condition.

12. The assembly of claim 10, wherein the locking device further includes a second detent associated with the collapsed position for releasably registering the button when moved to the collapsed position.

13. The assembly of claim 12, wherein the second detent is concealed from outside the assembly and the button is retractable from the second detent in response to applying a bodily extension force on the telescopic sections.

14. The assembly of claim 13, wherein the button provides greater resistance to sliding movement when registered in the first detent than when registered in the second detent.

15. The assembly of claim 12, wherein the locking device includes a longitudinal groove extending between the first and second detents for guiding the button during movement between the extended and collapsed position of the at least two sections.

16. The assembly of claim 15, wherein the at least two sections each comprise metallic tubes.

17. The assembly of claim 16, wherein one of the at least two sections includes a non-metallic inner sleeve for slideably supporting the other of the at least two sections.

18. The assembly of claim 17, wherein the groove is formed in the liner.

19. The assembly of claim 10, wherein the at least one button comprises a pair of spring-biased buttons.

20. The assembly of claim 1, including magnetic coupling portions.

21. The assembly of claim 20, wherein the magnetic coupling portions include rare earth magnets having positive and negative poles for magnetically coupling one tree climbing assembly with another tree climbing assembly.

* * * * *